Patented Mar. 12, 1929.

1,704,771

UNITED STATES PATENT OFFICE.

EUGENE VIERLING SPENCE, OF SAN ANGELO, TEXAS.

PAVEMENT.

No Drawing.  Application filed August 25, 1926.  Serial No. 131,539.

My invention relates to a pavement or the like.

In many localities, the laying of pavement or building of highways is a very expensive undertaking, due to the fact that satisfactory materials are not economically available. In parts of the United States, particularly along the Gulf coast and other places, there is little stone or rock economically available for road building or paving purposes. On the other hand, along the coast in many places there is an abundant supply of mud shell, which may be readily dredged. I have found that a satisfactory pavement can be constructed of mud shell when combined with other materials to be hereinafter mentioned.

Mud shell is quite different from sea shell and mature oyster shell and is shell, such as oyster shell, which in its early or immature stages is covered by silt or mud deposited thereon by streams or rivers emptying adjacent the shell beds which may be in bays or like bodies of water. This mud settles upon the immature oyster shells and not only prevents the oysters from maturing but prevents borers from destroying the shells.

Among the objects of my invention are: to provide a pavement which may be formed principally of mud shell, thus reducing the cost of the paving material in many localities; to provide a pavement which will have inherent stability, low absorption, offer a high resistance to shoving under traffic, cracking and disintegration, and one which offers low tractive resistance and which wears well under traffic.

Briefly stated, in the preferred form of the invention, I employ an aggregate of mud shell which may be used in its natural state, that is, without washing. The mud shell is dried and preferably graded to certain sizes and, if there is a deficiency of fine aggregate in the mud shell, sufficient fine material, such as sand, is added. Fine mineral filler, which may be Portland cement, limestone dust, or other mineral powder, may be added, and these materials are then mixed with a bituminous binder while hot and spread in place on a prepared foundation. After being spread, the roadway is properly compacted by rolling or otherwise and, if desired, a seal coat preferably formed of hot asphalt is squeegeed over the surface and sand or fine shell and the like is broadcast over the surface and compacted.

I will now describe in detail the making of a preferred form of paving, but it is of course understood that I do not wish to be limited to the specific proportions herein stated for changes may be made without departing from the invention.

The mud shell as it is dredged is transported to a suitable drier, preferably of the rotary kiln type, and very thoroughly dried and tumbled to break up any lumps of mud and to loosen the finer particles from the coarser in the mud shell. After being thoroughly dried and tumbled, the mud shell is preferably graded and, in general, two gradings may be employed; that is, all material retained on about a one-quarter inch screen may be classed as coarse aggregate, and that passing a one-quarter inch screen may be classed as fine aggregate. Shells, for example oyster shells, retained on a two inch screen are usually rejected since larger shells are sometimes troublesome when the surface course of the paving is relatively thin, say 1½ to 2 inches. A well proportioned aggregate may meet the following requirements:

Material passing a 200 mesh screen, 1% to 2%; that passing an 80 mesh screen and retained on a 200 mesh, 1% to 3%; that passing 40 mesh and retained on 80 mesh, 1.2% to 3%; that passing 10 mesh and retained on 40 mesh, 12% to 18%; that passing one-quarter inch screen and retained on 10 mesh screen 12% to 40%; that passing ½ inch screen and retained on ¼ inch screen, 18% to 35%; that passing ¾ inch screen and retained on ½ inch screen, 3% to 10%; that passing 1 inch screen and retained on ¾ inch screen, 4% to 10%; that passing 1¼ inch screen and retained on 1 inch screen, 0 to 12%; that passing 1½ inch screen and retained on 1¼ inch screen, 2% to 12%; that passing a 2 inch screen and retained on 1½ inch screen, 0 to 5%.

The fine aggregate may consist of clean hard sand preferably free from clay, loam, or other foreign matter, together with particles of mud shell passing a ¼ inch laboratory screen. The sand or other fine aggregate should preferably not contain more than 10% of particles which will pass a 200 mesh sieve.

The fine mineral filler may consists of dry limestone dust, beach sand, Portland cement, or the like, and should be of such fineness that not less than about 65% will pass a 200 mesh sieve and 100% will pass a 30 mesh sieve.

The bituminous binder may consists of asphalt or other materials of which there are many now on the market.

In preparing the paving mixture, the requisite quantities of coarse aggregate, fine aggregate, and mineral filler, are charged into a suitable mixer and, after these materials have been thoroughly mixed, sufficient hot bituminous binder is added to thoroughly coat all the particles and preferably produce a mixture containing from about 6% to 10% bitumen, soluble in carbon bisulphid, and the mixing is continued over a sufficient length of time to produce a homogeneous mixture in which all of the particles of mineral matter are uniformly coated. The mineral matter may be heated, if desired, before charging into the mixer and the bituminous binder, such as asphalt, should be heated from about 250° Fahrenheit to 350° Fahrenheit. The prepared mix should then be transported while hot to the location to be paved and then distributed to a uniform thickness over a prepared base, such as a stone concrete base, old brick pavement or the like. The mixture is spread to a uniform thickness and then compacted as by means of power rollers. A satisfactory surface course may be about 1½ or 2 inches thick when finished.

The constituents of a surface course mixture as above described, may conform to the following composition limits by weight:

That passing a 2 inch screen and retained on 1¼ inch screen, from 5% to 10%; that passing a 1¼ inch screen and retained on a ½ inch screen, 9% to 17%; that passing a ½ inch screen and retained on a No. 4 sieve, 7% to 13%; that passing a No. 4 sieve and retained on a No. 10 sieve, 4% to 8%; that passing a No. 10 sieve, 30% to 60%. The portion of the combined aggregate passing the No. 10 mesh sieve as above mentioned, when considered separately from the remainder of the aggregate, may meet the following screen tests:

That passing a 10 mesh sieve and retained on a 40 mesh sieve, 10% to 20%; that passing a 40 mesh sieve and retained on an 80 mesh sieve, 20% to 30%; that passing an 80 mesh sieve and retained on a 200 mesh sieve, 25% to 45%; that passing a 200 mesh sieve, 10% to 20%. The above are not absolute limits but are given by way of example since it has been found that a satisfactory pavement can be constructed employing about the above proportions.

After the surface course has been sufficiently rolled and while still hot, hot asphalt may be uniformly squeegeed over the surface, preferably at the rate of about 0.2 of a gallon per square yard and, while this hot asphalt is still warm, dry, fine aggregate may be broadcast over the surface and the surface rolled until thoroughly bonded to the surface course first laid down. If required, additional fine aggregate may be spread and broomed over the surface during rolling in quantities sufficient to take up any excess of asphalt. The fine aggregate forming the part of the seal coat, just described, may consist of sand, fine mud shell or the like.

A pavement as above described possesses many advantages over others now in use. Mud shell in many localities may be obtained at relatively low cost and no expensive preparation of the mud shell is required. The mud shell need not be washed so as to produce perfectly clean shells since the sand and mud in the mud shell in its natural state may be advantageously employed in the design of the pavement. The shells, particularly those of large size, tend to flatten out parallel to the surface of the pavement and thus serve to reinforce the pavement more efficiently than rounded or angular stones, for example. The shells are often pitted or porous in character, thus providing for an excellent bond with the bituminous binder. A pavement as above described will have stability, will offer a high resistance to shoving under traffic, will offer relatively low tractive resistance, and will wear relatively slowly and uniformly.

While the invention has been described in great detail and illustrations of specific pavements given, I do not wish to be strictly limited to the illustrated examples for many changes may be made within the scope of the invention as defined in the appended claim.

I claim:

A pavement including a coarse aggregate of mud shell comprising immature shells in their natural state graded from about two inches down to about one-quarter inch, a fine aggregate including mud shell consisting of immature shells of dead shell fish and graded from about one-quarter inch downward, fine mineral filler, and an asphaltic binder to coat and bind the particles of aggregate and filler together into a pavement having stability.

EUGENE VIERLING SPENCE.